Patented Nov. 26, 1946

2,411,799

UNITED STATES PATENT OFFICE 2,411,799

DEALKYLATION OF ALKYL CYCLIC COMPOUNDS

William J. Mattox, Riverside, Ill., assignor to Universal Oil Products Company, Chicago, Ill., a corporation of Delaware No Drawing. Application March 27, 1944, Serial No. 528,344

4 Claims. (Cl. 260—672)

This invention relates to a process for removing one or more alkyl groups from mono- or poly-alkyl cyclic compounds to produce the corresponding cyclic compound devoid of alkyl side chains. More specifically, it relates to the removal of an alkyl group or groups from mono- or poly-alkyl aromatic hydrocarbons to produce the corresponding aromatic hydrocarbon free from alkyl side chains.

The cyclic compound which may be treated in accordance with the present invention may comprise an aromatic or naphthenic hydrocarbon, preferably containing 6 carbon atoms in the ring, and containing either one or more rings per molecule.

In a broad aspect the present invention relates to a process for producing a cyclic compound devoid of alkyl side chains from the corresponding cyclic compound containing at least one alkyl side chain, which comprises treating the alkyl cyclic compound with an alumina or alumina-containing catalyst in the presence of a hydrogen halide, preferably hydrogen chloride, under dealkylating conditions.

In one specific embodiment the present invention comprises treating an alkyl benzene with an alumina or alumina-containing catalyst in the presence of hydrogen chloride at a temperature of from about 450 to about 700° C.

Suitable catalysts comprise alumina produced by the controlled calcination of a hydrated aluminum oxide either naturally occurring or synthetic. The preferred catalyst comprises gamma alumina as the only form of aluminum oxide present. This may be produced by the controlled calcination of natural or synthetic hydrated aluminum oxides at temperatures above about 500° C. and preferably not in excess of 900° C. for a sufficient length of time to convert the hydrated oxide into the gamma form without leaving substantial amounts of the hydrated oxide and without converting any of the gamma alumina into the alpha form. If the latter condition occurs the catalyst will be substantially inert or at least of greatly reduced activity.

Naturally occurring minerals or earths containing alumina may also be used in the process although they are not necessarily equivalent to one another or to the synthetic forms of alumina. Bauxite which may be calcined to convert it into gamma alumina is a particularly good example of naturally occurring earth. Other aluminiferous clays may be used.

Naturally occurring aluminiferous earths may be used in the process after being treated chemically, for example, with mineral acids such as hydrochloric acids followed by washing to remove soluble salts. These materials are improved by calcination prior to use in the process.

Another type of catalyst which may be of considerable benefit comprises a synthetic mixture of silica and alumina prepared by the separate or simultaneous precipitation of hydrogels of the components from soluble compounds. These composites may be washed, dried, and calcined prior to use in the process.

The preferred hydrogen halide is hydrogen chloride although other hydrogen halides such as hydrogen bromide, hydrogen iodide and hydrogen fluoride may also be used. These are not necessarily exactly equivalent for my process.

In accordance with the invention, the alkyl cyclic compound is contacted with the alumina-containing catalyst at a temperature within the range of 450–700° C. and preferably approximately 500–600° C.

The space velocity employed may vary up to about 20, depending on the catalyst and the temperature. Higher space velocities may be used with more active catalysts and for a given catalyst at higher temperatures. Normally, an hourly liquid space velocity of about 0.2 to 5 is used when employing temperatures within the range of about 450–600° C. The space velocity as used herein is defined as the volumes of liquid charge per volume of catalyst per hour, the liquid being measured at room temperature.

The pressures employed may be subatmospheric, superatmospheric, or atmospheric. Good results may be obtained at pressures of atmospheric to about 100 pounds per square inch, although pressures above and below this limit may also be used depending on the temperature and space velocity.

To successfully carry out my invention it is necessary to correlate the conditions of temperature, pressure and space velocity, and this in turn depends to a certain extent upon the catalyst employed. Certain forms of the alumina of alumina-containing catalysts are more active than others and higher space velocities at a given temperature may be used with the more active catalysts.

The quantity of hydrogen halide employed may vary over a considerable range but normally at least 1 mol per cent is required. There is little benefit to be realized in using more than equimolar proportions of hydrocarbon and hydrogen halide. I do not, however, limit myself to this upper limit since it is possible to use higher ratios, even though in most cases there is no particular advantage in doing so.

The hydrogen halide may be separated and recycled to the process. It is not necessary to free the hydrogen halide completely of light hydrocarbon gases. However, it is necessary to remove substantial portions of the olefins produced during the dealkylation reaction before recycling the hydrogen halide to prevent build-up of this gas in the system.

The unconverted mono- or poly-alkyl cyclic compounds may be separated from the desired non-alkyl cyclic compound by fractionation or other suitable means, and the unconverted compounds may be recycled for further conversion.

The catalyst may be regenerated at intervals by burning it with an oxygen-containing gas to remove carbonaceous and hydrocarbonaceous deposits.

The catalysts may be used in the form of granules or preformed particles, or in the form of powder. The hydrocarbons undergoing treatment may be passed through beds of the alumina or alumina-containing catalyst, which may be contained in tubes or chambers. The reaction zone may or may not be externally heated. The catalyst may also be suspended in the hydrocarbon vapors in the form of a powder and passed through a heated reaction zone. In another modification the hydrocarbons and hydrogen halide may be contacted with fluidized powdered alumina or the hydrocarbons may be contacted with alumina on which hydrogen halide has previously been absorbed. The alumina may also be used to absorb and recover the hydrogen halide for re-use in the process. My invention is not limited to any particular apparatus or method of carrying out the contacting.

Under certain conditions and when using certain catalysts it may be desirable to add a relatively inert gas such as steam. This is of some utility, for example, when employing the synthetic silica-alumina type of catalyst.

The following example is introduced to further illustrate the novelty and utility of the present invention but not with the intention of unduly limiting the same.

Cumene was vaporized, mixed with an approximately equal molal quantity of hydrogen chloride, and passed at an hourly liquid space velocity of 0.93 and a temperature of 550° C. over Activated Alumina. Hydrogen chloride was removed from the reaction products, to leave 72.8%, by weight of the charge of a liquid fraction containing 85% benzene, 11% unreacted cumene and 4% of intermediate fractions, and 26.2% by weight of the charge, of a condensed gas fraction containing more than 80% of propylene.

I claim as my invention:

1. A process for dealkylating a mono-alkyl cyclic compound, which comprises contacting said mono-alkyl cyclic compound with a catalyst comprising alumina as its essential active ingredient and a hydrogen halide under dealkylating conditions of temperature, pressure and time, separating a completely dealkylated cyclic compound and hydrogen halide from the resultant products, and recycling thus separated hydrogen halide to the dealkylation step.

2. A process for completely removing alkyl side chains from a mono-alkyl cyclic compound, which comprises treating said mono-alkyl cyclic compound with a catalyst containing alumina as its essential active ingredient and a hydrogen halide at a temperature of from about 450° C. to about 700° C., separating a completely dealkylated cyclic compound and hydrogen halide from the resultant products, and recycling thus separated hydrogen halide to the dealkylation step.

3. A process for producing benzene from a mono-alkyl benzene, which comprises treating said mono-alkyl benzene with a catalyst containing alumina as its essential active ingredient and a hydrogen halide under dealkylating conditions of temperature, pressure and time, separating benzene and hydrogen halide from the resultant products, and recycling thus separated hydrogen halide to the dealkylation step.

4. A process for producing an unsubstituted aromatic hydrocarbon from the corresponding mono-alkyl aromatic hydrocarbon, which comprises treating said mono-alkyl aromatic hydrocarbon with a catalyst containing alumina as its essential active ingredient and hydrogen chloride at a temperature of from about 450° C. to about 700° C., separating aromatic hydrocarbon and hydrogen halide from the resultant products, and recycling thus separated hydrogen halide to the dealkylation step.

WILLIAM J. MATTOX.